May 2, 1950

P. P. BRIGGS 2,505,850

SEAL SLOT FOR CATALYST BED SCREENS
IN CATALYST CHAMBERS
Filed Aug. 20, 1946

*INVENTOR.*
PRESTON P. BRIGGS

BY Hudson C Young

ATTORNEYS

Patented May 2, 1950

2,505,850

UNITED STATES PATENT OFFICE 2,505,850

SEAL SLOT FOR CATALYST BED SCREENS IN CATALYST CHAMBERS

Preston P. Briggs, Bartlesville, Okla., assignor to Phillips Petroleum Company, a corporation of Delaware Application August 20, 1946, Serial No. 691,865

4 Claims. (Cl. 23—288)

This invention relates to catalyst chambers. In one of its more specific aspects it relates to catalyst supports for use in catalyst chambers in high temperature service. In a still more specific aspect it relates to catalyst supports and a method and means for establishing a catalyst tight seal between a catalyst bed screen and a chamber sidewall and yet provide for the free and unobstructed thermal expansion of the screen.

An object of my invention is to provide in a catalyst chamber sidewall insulation a seal slot for the outer edge of a catalyst bed supporting screen.

Another object of my invention is to provide in a catalyst chamber sidewall insulation a seal slot for the outer edge of a catalyst bed supporting screen which seal slot provides a tight seal against catalyst leakage around the edge of the screen.

Still another object of my invention is to provide in a catalyst chamber sidewall insulation a seal slot for the outer edge of a catalyst bed supporting screen, which seal slot provides room for expansion of the screen during the heating of the catalyst to reaction temperature.

Still another object of my invention is to provide a seal slot tight against catalyst leakage and which will permit free expansion of the catalyst supporting screen and yet one which is easy to construct, and to disassemble when rebuilding or reinsulating of a catalyst chamber may be necessary.

Still other objects and advantages of my invention will be apparent to those skilled in the art from a careful study of the following description and attached drawing which respectively describes and illustrates one embodiment of my catalyst screen seal slot.

In the drawing Figure 1 is a sectional elevation of my seal slot assembly.

Figure 1:
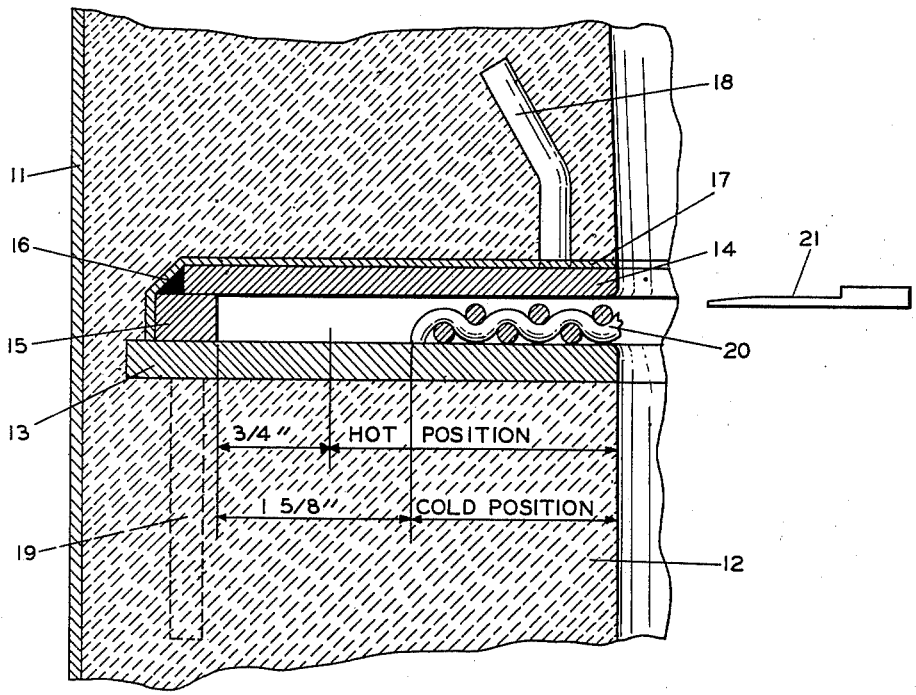

Referring now to the drawing, Figure 1 is intended to illustrate a vertical section of a catalyst chamber side wall containing my seal slot with a catalyst support screen inserted. This slot extends circumferentially around the entire wall of the chamber, making in fact, an annular slot into which the circumference of a catalyst support screen extends for sealing against catalyst leakage and thermal expansion purposes.

In Figure 1, numeral 11 refers to a steel wall of a catalyst chamber which is covered with a layer of refractory material 12. A base plate 13 is disposed horizontally and rests firmly on a base of the refractory material 12 and is held rigidly in place by an anchor pin 19. An upper or top plate 14 is disposed horizontally also, but at a spaced distance from the base plate. This spaced distance is determined by the thickness of a spacer bar 15 between the two plates 13 and 14. The spacer bar 15 may be attached to the upper plate by a weld 16. A retainer pin 18 embedded in the upper insulation assists in holding the unsupported portion of the upper plate 14 in spaced relation with respect to the lower plate 13. In this narrow slot between the upper and lower plates is inserted the edge of the catalyst supporting screen, as shown. This screen may be supported on any type of supporting means in the bottom of the catalyst containing vessel, such as a beam and grid assembly.

Figure 4:
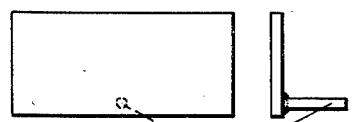
Figure 4 shows a plan view and an end view of a base plate.

The base plate 13 does not consist of one annular ring member for installation within the wall of a chamber but instead consists of a plurality of individual plates, one of which is illustrated in Figure 4. Each base plate section has an anchor pin 19 as shown. When a plurality of the base plates is assembled, they are spaced end-to-end as indicated by reference numerals 13 in Figure 2. These plates are so arranged as to form a circle around the catalyst vessel and embedded within the side wall refractory liner 12. This arrangement, I have found, is preferable to the use of a single annular base plate ring since each individual plate member expands only a relatively small amount as compared to the expansion of a "solid ring" for any given temperature increase. The use of the small plate sections in the lower plate and the upper plate also markedly facilitates installation.

Figure 3:
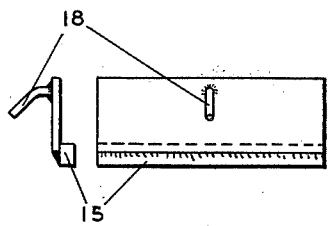
Figure 3 shows a plan view and an end view of a top plate and a spacer bar in assembled relation to one another.

In a similar manner and for a like reason the top plate 14 of the assembly is composed of a plurality of rectangular shaped plates, one of which is illustrated in Figure 3. To each top plate 14 may be welded or otherwise rigidly attached the spacer bar 15 and the retainer pin 18.

Covering adjacent ends of these top plates are small cover plates 17. Each cover plate may consist of a horizontally disposed flat section, one end of which is curved downward so that when in position this downward bent portion will cover the weld 16 and spacer bar 15 and terminate at the surface of a base plate, as may be seen by reference to Figure 1.

Figure 2:
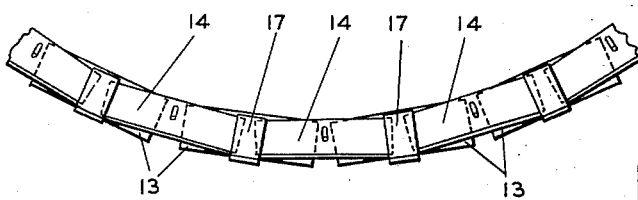
Figure 2 is a horizontal plan view of the assembled metal parts of my seal slot.

The cover plates 17 are intended to prevent the refractory material 12 from entering the seal slot at points between the ends of the upper plate members. Figure 2 illustrates the positioning of these cover plates 17.

The base plates 13 and the upper plates 14 are staggered with respect to each other around the catalyst chamber wall so that joints of adjacent top plates will not coincide with joints of adjacent base plates, and Figure 2 shows this "staggering" construction.

In the construction of a catalyst chamber my seal slot may be made and the component parts installed as the refractory liner is cast in place. For example, a cylindrical shaped vessel, vertically disposed, is frequently used as a catalyst or reaction vessel. In such a vessel, the bottom insulation or refractory liner may be installed as desired, leaving an opening of course, for entering or discharging reaction materials. In some such vessels, this bottom liner may have its upper surface as a horizontal plane so that beams or other structural members may rest thereon for supporting grid work. Such beams may be radially arranged, or may be parallel or in any other desired configuration. When parallel or circular beam supports are used it may be of advantage to cast channels in this bottom insulation so as to assist in the flow of reaction materials from all portions of a catalyst bed to some central or common outlet point. Such channels may likewise be of value for distributing incoming reactant over the cross sectional area of the vessel when the bottom of the vessel is the inlet end.

After installation of the vessel's bottom refractory, side wall refractory may be installed up to such a point as required for laying my ring of base plate members.

A castable or moldable concrete type insulation and refractory material such as "insulcrete" has been found satisfactory for use as a high temperature reactor liner, and I will explain the construction of my seal slot when using an "insulcrete" liner.

It is to be understood, however, that other lining material may be used in combination with my seal slot provided it possesses satisfactory properties for a given purpose.

"Insulcrete" material when mixed with water makes a plastic mass which sets and hardens quite rapidly. Such a plastic mixture may, however, be poured or molded into forms or molds or applied by a "gunite" or spray method as desired. Since this "insulcrete" material sets so rapidly it is necessary to prepare only small quantities at a time, and pour the same into place before mixing a second portion. In such a manner, I may cast this refractory, quantity by quantity, so as to set or place the base plates 13 one at a time around the periphery of the chamber. For such an operation, forms of course are preferably placed before casting or pouring is started, and such a procedure markedly expedites work.

When all base plates are laid and the refractory material up to the base plates has hardened, molds or forms may be removed, and the catalyst support members such as beam and grid assemblies may be installed. When grids or other type of supports are used, the upper surface of such support should preferably be in a common horizontal plane with the upper surface of the previously set base plate members so that when a catalyst supporting screen is so laid thereupon, it will rest upon a plane surface.

Upon installation of the base plates 13 and grid and support assembly the catalyst screen 20 may then be placed and centered in such a manner that the distance between the edge of the screen and the inner edge of the base plates is uniform all around the entire ring of base plates. When the screen is thus properly centered the upper or top plate ring may be placed.

This ring of top plates 14 may be placed one at a time in a manner similar to the piecewise placing of the bottom plates. However, the spacer bars may preferably be previously welded or otherwise attached to the top plate members, as illustrated in Figure 3 of the drawing.

Figure 6:
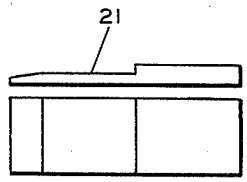
Figure 6 shows a plan view and a side view of a feeler gage.

In the placing of the ring of upper plates it is critical that the unsupported edge of these plates be properly supported and spaced from the ring of bottom plates 13 during installation thereof. As mentioned above, I prefer to place or to install these upper plates one or two at a time. This piecewise installation is necessitated on account of the very short setting time of the "insulcrete" refractory. In placing an upper plate member 14, I use spacer or feeler gages as illustrated in Figure 6. In one instance, I found it necessary to provide only two of these spacer gages, since the refractory-water mortar set so rapidly. In setting a first upper plate, I place a spacer gage under each end, then the adjacent surfaces of the upper and lower plates are substantially parallel. The spacer portion 21 of the spacer gage is made of such thickness that its thickness plus the screen thickness equals the thickness of the spacer bar 15 and when the spacer gage is inserted between the screen and an upper plate 14, these plates are parallel or substantially so.

As mentioned above, for installing the initial upper plate, the plate is staggered with respect to the lower plates in such a manner that the ends of the upper plate are directly over a midpoint of the lower plates with, of course, the retainer pin extending upward and pointing toward the periphery of the catalyst vessel. When this initial plate is so positioned, some "insulcrete" or other similar refractory and water mixture is poured on the upper surface of this plate covering the retainer pin 18. The ends of this plate are not covered with the mortar at this time. Within a short time this refractory has "set" and is sufficiently firm that one of the spacer gages may be removed.

Figure 5:
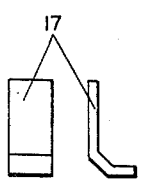
Figure 5 shows a plan view and an end view of a cover plate.

A second upper plate is then positioned with one end resting on the same spacer gage as the adjacent end of the first set upper plate. The second spacer gage is placed under the other end of this second plate. In order to prevent the refractory mortar from contacting the screen 20 through the space at adjacent ends of these first and second upper plates, a "cover plate" 17 as illustrated in Figure 5 is placed over this open space as indicated in the assembly shown in Figure 2 and also as shown in the cross section of Figure 1. This cover plate need not be anchored nor attached to either of the upper plates 14 since the refractory when poured and set holds it rigidly in place. After placing the cover plate as just described, a second batch of refractory mortar is prepared and run into place making full and complete contact with that already on the first top plate. The far end of the second plate is not covered with refractory just as the ends of the first plate were not at first covered. Upon setting of this second batch of refractory, the spacer gage under the finished joint is removed and placed in position to support a third top plate. This type of plate by plate assembling and running of refractory mortar with proper placing of the cover plates is continued until the complete ring of upper plates 14 is completed. The two spacer gages having served their purpose are discarded or stored for future use.

Following this seal slot installation, any other lining to be installed in the chamber is installed. After sufficient time for setting, hardening and/or drying, the chamber is in condition for filling with catalyst prior to use in high temperature processing.

As mentioned hereinbefore, the thickness of the spacer portion of the spacer gage is critical. This thickness must be as small as possible, yet large enough that the support screen 20 may rest freely on the bottom plate and is able to expand diametrically further into the slot without binding. The distance from the top surface of the screen to the bottom surface of the upper plates 14 must be sufficiently small as to prevent entrance of catalyst grains into the slot. Yet, this distance must be sufficiently large that upon heating of the vessel and contents to reaction temperature, the upward linear expansion of the screen supporting assembly (beam and grid work) will just lift the top of the screen 20 to contact or nearly contact the lower surface of the ring of top plates 14. The top of the screen should not exert force against the ring of top plates 14 since when such is the case, the screen is not free to expand or to contract diametrically in the seal slot.

*Example*

In one installation in a 12-foot diameter catalyst chamber, the metallic catalyst support screen was 9 feet 6 inches in diameter and expanded approximately 1¾ inches when heated from 100° F. to a reaction temperature of 1600° F. Assuming that the screen at the axis of the chamber does not move during expansion or contraction, then the outer edge will expand and contract about ⅞ inch. Thus the outer edge of the screen moves toward the spacer bar to the extent of ⅞ inch during heating of the chamber and contents from 100° F. to 1600° F., and of course, during cooling the screen contracts a like amount.

In this installation the upper plates were 10½ inches long by 3½ inches wide by ¼ inch thick. The lower or base plates were 10½ inches long by 4 inches wide by ¼ inch thick. The spacer bar was 10½ inches long by ½ inch wide by ⅜ inch thick and a spacer bar was welded to each of the upper plates prior to assembly. The cover plates were of 20 gage plate metal 2 inches wide by 3½ inches long and covered the upper plates, and extended over the weld 16 and over the spacer bar 15 as shown in Figure 1.

The spacer gage was approximately 0.100 inch in thickness. The catalyst supporting screen was woven of 0.105-inch diameter wire to make a 4-mesh by 4-mesh screen. The screen thickness was about 0.275, making the screen thickness 0.275 inch plus the spacer gage thickness 0.100 total 0.375 inch which is equal to the ⅜ inch thickness of the spacer bar 15.

At a reaction temperature of 1600° F. the periphery of the screen was approximately ¾ inch from the adjacent side of the spacer bar 15 while at atmospheric temperature (100° F.) the screen was 1⅝ inches from the spacer bar. The difference in these screen positions, 1⅝ inches minus ¾ inch equals ⅞ inch, the amount of expansion and contraction of the screen mentioned hereinbefore.

The metal parts such as the upper and lower plates, the spacer bar and the cover plate should be of a material which will withstand high temperature conversion conditions, combustive regeneration and not deteriorate by oxidation, reduction, or other corrosion. These metal members must be strong and not soften at reaction or regeneration temperatures. Metal must not adhere to metal at temperatures employed. High chromium-nickel steels have been found to be satisfactory for use as herein described. Other alloys suitable for the problem at hand and possessing satisfactory properties may of course be used. I have found that such high chromium stainless alloy steel as A. I. S. I. (American Institute of Steel and Iron) Type 316, 321 or 347 are suitable for these metal parts.

The particular design of the metal parts as regards size and shape, and distance between top of the screen and the lower surface of the top plate 14, and the thickness, etc. of the spacer bar may be varied to suit a particular problem and yet remain within the scope and spirit of my invention.

Having disclosed my invention, I claim:

1. A contact vessel for contacting a fluid with a solid contact material, said vessel having a refractory insulation lining and a solid material support within the chamber formed by said insulation lining, said support including a screen member, comprising a circumferential slot recessed within said refractory lining to slidably engage the peripheral edge of said screen member; a base plate extending circumferentially around said slot in said chamber and embedded within said insulation lining; and a top plate extending circumferentially around said slot in said chamber and embedded within said sidewall insulation, said top plate being separated from said base plate so as to slidably retain the peripheral edge of said screen therebetween but so as to substantially prevent the passage of solid material fines between said screen and said plates.

2. A contact vessel for contacting a fluid with a solid contact material, said vessel having a refractory insulation lining and a solid material support within the chamber formed by said insulation lining, said support including a screen member, comprising a circumferential slot recessed within said refractory lining to slidably engage the peripheral edge of said screen member; an annular base plate extending circumferentially around said slot in said chamber and embedded within said insulation lining, said base plate comprising a plurality of sections horizontally disposed end-to-end; an annular top plate extending circumferentially around said slot in said chamber and embedded within said sidewall insulation, said top plate comprising a plurality of sections horizontally disposed end-to-end; and a spacer at the outer edges of said plates spacing said plates apart, said plates being spaced apart a sufficient distance so as to slidably retain the peripheral edge of said screen but so as to substantially prevent the passage of solid material fines between said screen and said plates.

3. The contacting vessel of claim 2, wherein said top and base plates comprise a plurality of substantially rectangular shaped plates disposed end-to-end and forming said annular base plate and said annular top plate; a plurality of cover plates covering the joints between said plates forming said top plate; and said spacer comprising a plurality of spacer bars, one of which is fixed to each of the plurality of plates forming said top plate.

4. A solid material seal comprising a plurality of horizontally disposed base plates, said base plates being disposed end-to-end; anchor pins for anchoring said base plates in the refractory wall of a contact chamber so as to form a base ring therein; a plurality of horizontally disposed top plates having anchor pins for anchoring said top plates in said refractory wall of said contact chamber a spaced distance above said base ring, said top plates being disposed so as to be centrally located above the gap between adjacent ends of said base plates; a screen member for supporting said solid material in a contact chamber horizontally extending at its peripheral edge into the space between said base and top plates; and a plurality of spacer bars spacing said top plates from said base plates, whereby said top plate is spaced from said base plate only far enough to allow the free movement of said screen in said space when at a high temperature but not far enough to allow substantial passage of solid material fines between said screen and said top and base plates.

PRESTON P. BRIGGS.

REFERENCES CITED

The following references are of record in the file of this patent:

UNITED STATES PATENTS

| Number | Name | Date |
|---|---|---|
| 1,802,960 | Simonds | Apr. 28, 1931 |
| 2,074,061 | Mullen | Mar. 16, 1937 |